(12) United States Patent
Fredriksson et al.

(10) Patent No.: US 9,548,488 B2
(45) Date of Patent: Jan. 17, 2017

(54) METHOD FOR MANUFACTURING ELECTRODE

(71) Applicant: Nilar International AB, Täby (SE)

(72) Inventors: Lars Fredriksson, Täby (SE); Neil H. Puester, Aurora, CO (US)

(73) Assignee: Nilar International AB, Täby (SE)

( * ) Notice: Subject to any disclaimer, the term of this patent is extended or adjusted under 35 U.S.C. 154(b) by 0 days.

(21) Appl. No.: 15/224,107

(22) Filed: Jul. 29, 2016

(65) Prior Publication Data

US 2016/0336589 A1 Nov. 17, 2016

Related U.S. Application Data

(62) Division of application No. 12/430,678, filed on Apr. 27, 2009, now Pat. No. 9,431,676, which is a division of application No. 10/434,167, filed on May 9, 2003, now abandoned.

(30) Foreign Application Priority Data

Nov. 8, 2002 (SE) .................................... 0203307-4

(51) Int. Cl.
*H01M 4/30* (2006.01)
*H01M 4/04* (2006.01)
*H01M 4/66* (2006.01)
*H01M 10/34* (2006.01)
*H01M 4/525* (2010.01)
*H01M 4/38* (2006.01)

(52) U.S. Cl.
CPC ............. *H01M 4/30* (2013.01); *H01M 4/0402* (2013.01); *H01M 4/0435* (2013.01); *H01M 4/383* (2013.01); *H01M 4/525* (2013.01); *H01M 4/66* (2013.01); *H01M 4/663* (2013.01); *H01M 10/345* (2013.01)

(58) Field of Classification Search
None
See application file for complete search history.

(56) References Cited

U.S. PATENT DOCUMENTS

| | | |
|---|---|---|
| 1,678,405 A | 7/1928 | Oppenheim |
| 1,930,287 A | 10/1933 | Short et al. |
| 2,252,776 A | 8/1941 | Losee |
| 2,339,208 A | 1/1944 | Van Der Pyl |
| 2,555,301 A | 6/1951 | Chubb |
| 2,696,515 A | 12/1954 | Koren et al. |
| 2,775,080 A | 12/1956 | Stim et al. |
| 3,050,776 A | 8/1962 | Kopper |
| 3,099,042 A | 7/1963 | Rabl |

(Continued)

FOREIGN PATENT DOCUMENTS

| | | |
|---|---|---|
| DE | 3048157 | 8/1981 |
| DE | 3117660 | 11/1982 |

(Continued)

*Primary Examiner* — Maria J Laios
(74) *Attorney, Agent, or Firm* — Capitol City TechLaw

(57) ABSTRACT

An electrode for a biplate assembly includes an active material made from a compressed powder 11, and a non-metal carrier 10. A biplate assembly 20 includes electrodes 27, 28 each having a non-metal carrier 10. A method is disclosed for manufacturing an electrode 13 having a non-metal carrier 10. An apparatus 30 is disclosed for manufacturing such an electrode 13. A bipolar battery includes at least one such an electrode 13. The non-metal carrier 10 is preferably a non-conductive carrier.

8 Claims, 2 Drawing Sheets

(56) References Cited

U.S. PATENT DOCUMENTS

| | | |
|---|---|---|
| 3,201,281 A | 8/1965 | Solomon et al. |
| 3,272,654 A | 9/1966 | Lang |
| 3,356,607 A | 12/1967 | Eisenmann et al. |
| 3,430,751 A | 3/1969 | Bateson |
| 3,560,262 A | 2/1971 | Baba et al. |
| 4,161,569 A | 7/1979 | Faber |
| 4,192,914 A | 3/1980 | Ruetschi |
| 4,197,635 A | 4/1980 | Bilhorn |
| 4,284,030 A | 8/1981 | Hamilton |
| 4,318,430 A | 3/1982 | Perman |
| 4,429,442 A | 2/1984 | Thomas |
| 4,542,082 A | 9/1985 | Rowlette |
| 4,628,593 A | 12/1986 | Fritts et al. |
| 5,186,956 A | 2/1993 | Tanino et al. |
| 5,478,363 A | 12/1995 | Klein |
| 5,498,489 A | 3/1996 | Dasgupta et al. |
| 5,509,795 A | 4/1996 | Near et al. |
| 5,985,202 A | 11/1999 | Ozaki et al. |
| 5,993,494 A | 11/1999 | Malikayil |
| 6,007,632 A | 12/1999 | Reis et al. |
| 6,180,281 B1 | 1/2001 | Schneider et al. |

FOREIGN PATENT DOCUMENTS

| | | |
|---|---|---|
| EP | 0239846 | 10/1987 |
| FR | 2583377 | 12/1986 |
| GB | 1038152 | 8/1966 |
| GB | 1395584 | 5/1975 |
| JP | 6325756 | 11/1994 |
| JP | 11102697 | 4/1999 |
| JP | 2001338642 | 12/2001 |
| JP | 2001351616 | 12/2001 |
| JP | 2002093407 | 3/2002 |
| JP | 2002110146 | 4/2002 |
| WO | 8807097 | 9/1988 |
| WO | 9746345 | 12/1997 |
| WO | 03009413 | 1/2003 |
| WO | 03026055 | 3/2003 |

METHOD FOR MANUFACTURING ELECTRODE

CROSS REFERENCE TO RELATED APPLICATIONS

This application is a Divisional Application of U.S. patent application Ser. No. 12/430,678, filed Apr. 27, 2009, which is a Divisional Application of U.S. patent application Ser. No. 10/434,167, filed May 9, 2003, the entire content of both of which is incorporated herein by reference.

This application claims priority under 35 USC §119(a)-(d) to Swedish Patent Application No. 0203307-4, filed Nov. 8, 2002, the entire content of which is incorporated herein by reference.

BACKGROUND

Technical Field

The present invention relates to an electrode. The invention also relates to a method for manufacturing an electrode. The invention further relates to a biplate assembly and a bipolar battery.

Description of Related Art

Traditionally, electrodes to bipolar batteries have been manufactured using some type of conductive carrier, a metal grid or mesh, to increase the conductivity between the electrode and the biplate of the biplate assembly, and to support the electrode during transport and assembly. Active material in the form of powder has also been used, which has been compressed to achieve a suitable thickness and density.

Planar electrodes may have any shape, but have to be formed into the desired shape by cutting the supporting metal structure and the compressed powder. There is a high risk that the electrode is damaged due to vibrations from cutting the metal carrier. Also sharp conductive edges may be the result of shaping the electrode.

There is a need for an electrode that is easy to shape, and that is safe to handle during assembly of biplates and bipolar batteries.

SUMMARY

The object of the present invention is to provide an electrode and an apparatus for manufacturing an electrode, which provides an easy manufacturing process to form the electrode into a desired shape compared to prior art electrodes.

This object is achieved by an electrode, a method for manufacturing an electrode, and an apparatus for manufacturing an electrode.

It is a further object of the present invention to provide a biplate assembly and a bipolar battery comprising an electrode which is easy to manufacture and handle during assembly.

This further object is achieved by a biplate assembly, and a bipolar battery.

An advantage associated with the present invention is that the electrode is easier to manufacture compared to prior art electrodes.

Another advantage is that the cost for manufacturing the electrode is reduced compared to conventional prior art electrodes having a supportive carrier.

Still another advantage is that the weight of the electrode is reduced, since no conductive support structure is necessary within the electrode.

Still another advantage is that no conductive sharp edges will occur on a shaped electrode, as may be the case when cutting an electrode having a metal supportive structure.

Still another advantage is that it is easier to obtain a flat electrode from pressed powder compared with electrodes having a metal carrier, since the metal carrier is deformed during the pressing of the powder.

Further objects and advantages of the present invention will be apparent to those skilled in the art from the following detailed description of the disclosed bipolar electrochemical battery and the biplate assembly.

BRIEF DESCRIPTION OF THE DRAWINGS

The different embodiments shown in the appended drawings are not to scale or proportion, but exaggerated for the sake of clarity.

DESCRIPTION OF EXAMPLE, NON-LIMITING EMBODIMENTS

Figure 1:
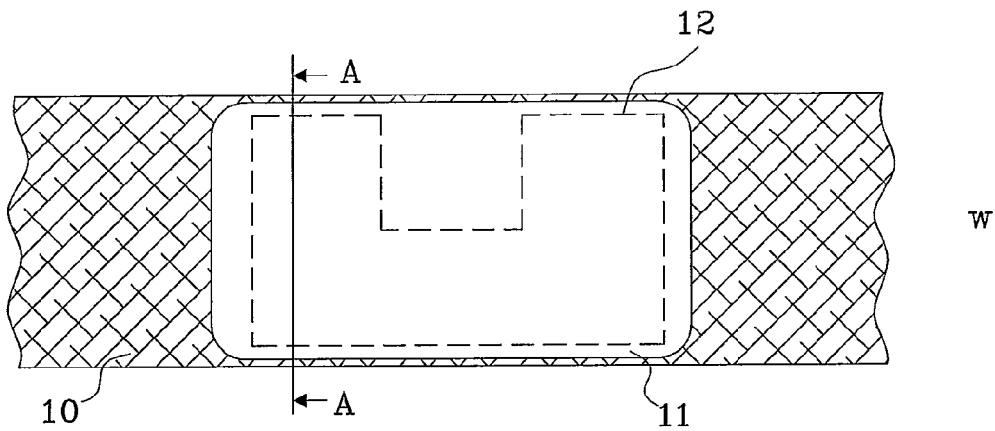
FIG. 1 shows a planar view of an electrode being arranged on a non-conductive carrier according to the invention.

FIG. 1 shows a non-metal carrier 10 made from a conductive material, such as a woven carbon fibre cloth, or non-conductive material, such as a polymer preferably made from polypropylene, having a predetermined width w and an arbitrary length. The carrier 10 is preferably arranged in a roll, see FIG. 4. A compressed powder 11 is arranged on the non-metal carrier 10 and a desired shape of the electrode 13 is outlined by the dashed line 12. The compressed powder 11 and the carrier 10 are cut along line 12 to form the electrode 13.

The use of pressed powder is disclosed in the PCT application PCT/SE02/01359, with the title "A method for manufacturing a biplate assembly, a biplate assembly and a bipolar battery" by the same applicant. In that application the powder is pressed directly onto the biplate to achieve thin electrodes having less active material. By pressing the active powder onto a non-metal carrier, the manufacturing process is further simplified.

For a NiMH bipolar battery, two different active materials need to be provided for manufacturing the electrodes. The positive active material in a NiMH battery manufactured according to the invention is preferably made from spherical nickel hydroxide (supplied by OMG, Finland); Nickel 210 fiber (supplied by INCO, USA); and Powdered Cobalt (obtainable from various suppliers). The negative active material is preferably made with Metal Hydride (supplied by Treibacher, Austria); and Nickel 255 fiber (supplied by INCO, USA). There are numerous suppliers of all these materials, particularly in Japan and China, where the majority of Nickel Metal Hydride cells presently are manufactured.

No other materials, such as conductive additives, binders, etc. are normally included. The nickel fibers INCO 210 and 255 serve as the conductive additives and make contact with the conductive biplate, conducting current from the active material directly to the conductive biplate.

Figure 2:
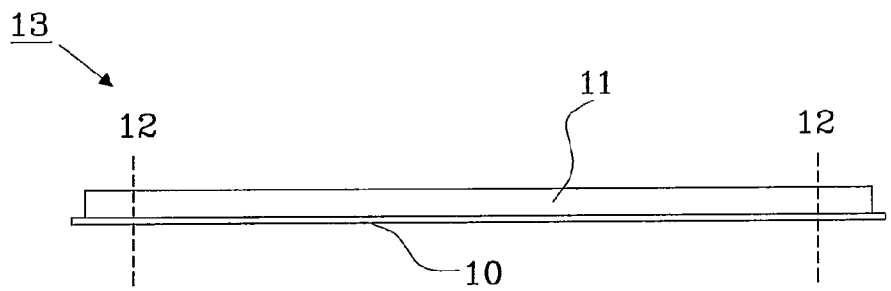
FIG. 2 shows a cross-sectional view along A-A in FIG. 1.

FIG. 2 shows a cross-sectional view along A-A in FIG. 1, where lines 12 indicate the desired shape of the finished electrode 13. The compressed powder 11 is mainly situated on top of the carrier 10. During compression of the active powder, some amount of the active powder may migrate to the other side of the carrier 10 depending on the structure of the carrier 10. If a random structure of polymer is applied, almost nothing will migrate through the carrier 10, but if a grid structure of polymer is used more active material will end up on the other side of the carrier 10, i.e. the carrier 10 could be placed in the center of the electrode 13. The reference numeral 13 indicates the electrode after cutting along lines 12.

Figure 3:
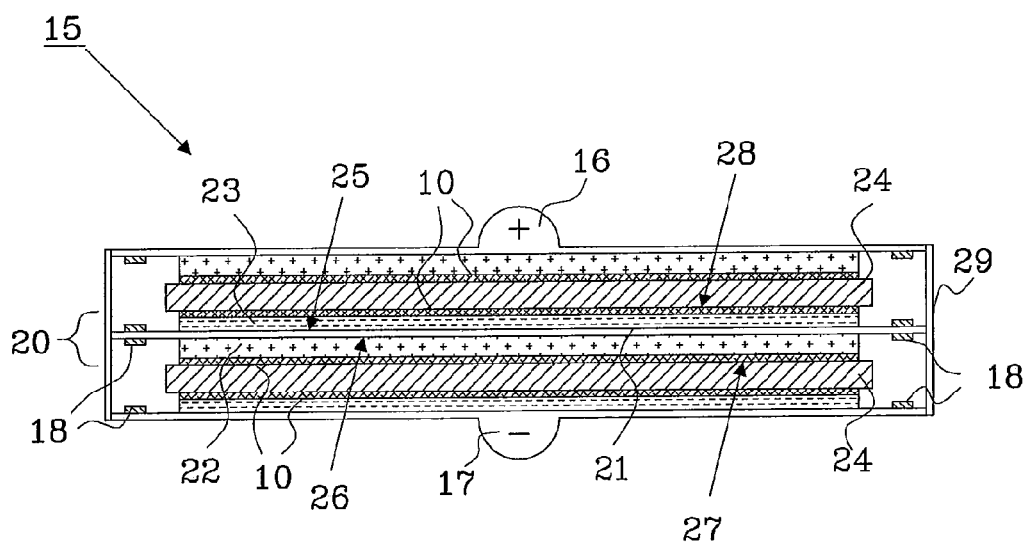
FIG. 3 shows a cross-sectional view of a bipolar battery including a biplate assembly having an electrode according to the invention.

FIG. 3 shows a bipolar battery 15, preferably a NiMH battery, having a positive 16 and a negative 17 end terminal. A biplate assembly 20 is provided comprising a biplate 21, a positive electrode 27 of positive active material 22 arranged on a non-metal carrier 10, and a negative electrode 28 of negative active material 23 arranged on a non-metal carrier 10. The active materials 22, 23 are powder pressed onto the carrier 10. The bipolar battery contains in this example only one biplate assembly, but several biplate assemblies may naturally be included in a bipolar battery.

The positive end terminal 16 has a positive electrode 27 and the negative end terminal 17 has a negative electrode 28. A separator 24 containing electrolyte is arranged between adjacent positive 27 and negative 28 electrodes. The non-metal carrier 10 of each electrode 27, 28 is preferably arranged towards the separator 24, as indicated in FIG. 3. The surface of the sides 25 and 26, respectively, of the biplate 21 is preferably a bit rough to keep the electrodes in place during manufacture and operations. The surface of the end terminals may naturally also be rough for the same purpose.

A hydrophobic barrier 18, as disclosed in the PCT application PCT/SE02/01645, with the title "A bipolar battery, a method for manufacturing a bipolar battery and a biplate assembly" by the same applicant, is provided around the positive 27 and negative 28 electrodes respectively to prevent electrolyte paths between adjacent cells. A housing 29 provides a sealing of the battery 15. The details of the construction of the battery provides a bipolar battery 15 with an electrolyte seal, the hydrophobic barrier 18, for each cell and a gas seal, the housing 29, for all cells in the battery.

The electrodes 27 and 28 including a non-metal carrier 10, preferably a non-conductive carrier, according to the invention may naturally be used in any type of bipolar battery having separately made electrodes.

Figure 4:
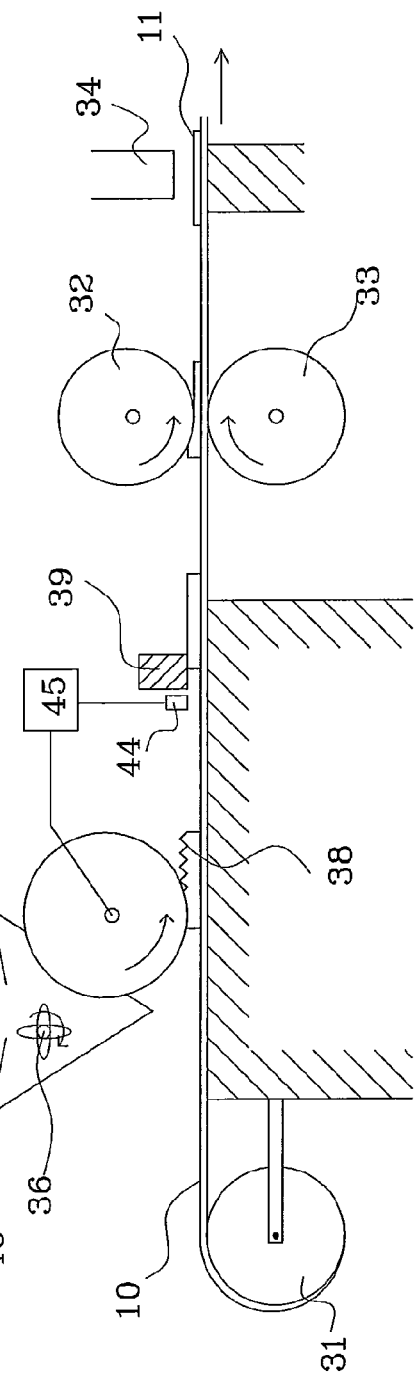
FIG. 4 shows a view of an apparatus for manufacturing an electrode according to the invention.

FIG. 4 shows an apparatus 30 for manufacturing an electrode having a non-metal carrier 10 according to the invention. A roll 31 with a tensioning device, such as a spring, supplies a non-conductive carrier 10 to the apparatus and two rollers 32 and 33 rotate to pull the carrier 10 under tension into the apparatus. A distributor 37 arranges active powder 38 on the carrier 10, and a spreader 39 levels the active powder 38 before the powder is compressed between the rollers 32 and 33. The powder 38 may either be arranged continuously on the carrier 10, or in a discrete fashion as shown in FIG. 4.

A compressed powder 11 is thus arranged on the carrier 10 and a cutter 34 forms the electrode into the desired shape. Scrap material after cutting is ground and recycled, which is possible due to the use of the non-metal carrier.

An agitator 36 is provided within the powder container and provides powder with a uniform density to the distributor 37, which collects powder in a uniform volume and distributes it to the carrier 10. This process is more described in connection with FIG. 5 below.

The powder container is provided with a level sensor 40, and a level control unit 41 opens a valve 42 to add more powder from a powder supply 43 when the level in the powder container is too low.

A sensor 44 is also provided at the spreader 39 to monitor the amount of powder arranged on the carrier 10 prior to leveling and pressing. The sensor 44 sends a signal back to the distributor, via a control unit 45, to alter the rotation speed and thereby change the amount of powder distributed to the non-metal carrier 10.

Figure 5:
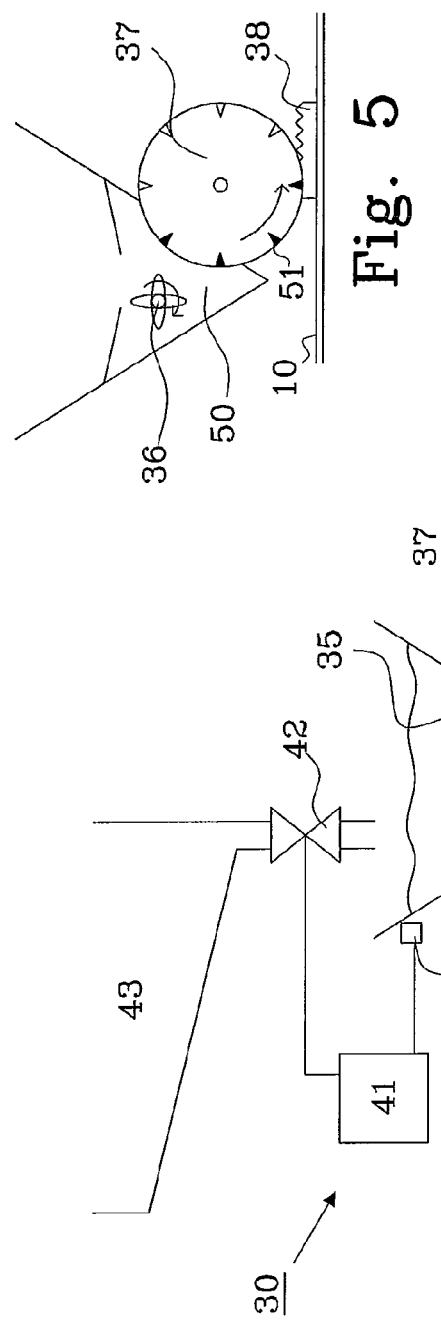
FIG. 5 shows a detailed view of the means for arranging active powder onto a non-conductive carrier.

FIG. 5 shows a detailed view of the mechanism distributing the active powder 50 onto the carrier 10. The purpose of the agitator 36 is to provide a uniform density powder to the distributor 37 and prevent "bridges", i.e. voids, that could occur in the powder supply container. The distributor 37 is provided with grooves 51 having a uniform volume, which are filled with the powder 50 during rotation, and the active powder is thereafter distributed to the carrier 10 in a suitable amount.

The preferred method uses the carrier 10 as a film to convey the loose powder into the rolling mill for compaction, and the process is conducted at room ambient conditions. The time, or rate of production, is most dependent upon the powder spreading mechanism and the roll diameters. An acceptable production rate requires 4 inch (approx. 10 cm) diameter rolls that have a preferred speed of 1.5 to 3 meters per minute. A lower production rate would be feasible, but not economical. Maximum speed is dependent on the equipment, including material handling to cut the strip to electrode size and convey the electrodes to subsequent steps, such as assembling steps.

The physical dimensions of the finished product (electrode) depend on the equipment specified. For heat transfer considerations at the final battery level, the equipment is limited to manufacture electrodes 6 inches (approx. 15 cm) wide. The thickness of the electrodes is in the range of 0.002 to 0.050 inches (approx. 0.05 to 1.3 mm), with a preferred range of 0.010 to 0.035 inches (approx. 0.25 to 0.90 mm). The final electrodes normally have the shape of a rectangle, but other shapes are naturally possible.

The electrode thickness depends upon the ratio of power required to energy required. Higher power applications require thinner electrodes. The non-conductive carrier 10 must transport the powder into the rolls without the material totally sieving through it. The final location of the carrier material can be anywhere within the electrode, but it is preferable to be closest to the side of the electrode that is placed in contact with the separator. The carrier material should allow sufficient particles to penetrate so the compressive forces compact the powder, and do not form the non-conductive carrier into a film.

What is claimed is:

1. A method for manufacturing an electrode for a biplate assembly in a bipolar battery, the electrode including an active material made from an active powder, and a carrier, the method comprising:
   selecting the carrier to be a non-metal carrier that is electrically non-conductive;
   forming the electrode by compressing the active powder onto the non-metal carrier to create the active material; and
   providing the non-metal carrier in the form of a random structure of polymer fibers that allows at least some amount of the active powder to migrate completely through the non-metal carrier when the electrode is formed, the non-metal carrier being a structural part of the electrode.

2. The method according to claim 1, wherein the method further comprises forming a shape of the electrode.

3. The method according to claim 2, wherein forming the shape of the electrode comprises cutting the active material and the non-metal carrier by a cutter.

4. The method according to claim 1, wherein the active powder is applied only to one side of the non-metal carrier.

5. The method according to claim 1, wherein the active powder is arranged continuously on the non-metal carrier.

6. The method according to claim 1, wherein the active powder is arranged discretely on the non-metal carrier.

7. The method according to claim 1, wherein compressing the active powder includes applying a compressing force on an amount of active powder to obtain an electrode having a thickness in the range of 0.05 to 1.3 mm.

8. The method according to claim 7, wherein the electrode is selected to have a thickness in the range of 0.25 to 0.90 mm.

\* \* \* \* \*